United States Patent
Wang et al.

(10) Patent No.: US 8,089,251 B2
(45) Date of Patent: Jan. 3, 2012

(54) BATTERY CHARGING CONTROL CIRCUIT

(75) Inventors: Han-Che Wang, Taipei Hsien (TW); Shin-Hong Chung, Taipei Hsien (TW); Xin Zhao, Shenzhen (CN); Hong-Sheng Ouyang, Shenzhen (CN); Ruey-Shyang You, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 463 days.

(21) Appl. No.: 12/408,727

(22) Filed: Mar. 23, 2009

(65) Prior Publication Data

US 2009/0256529 A1  Oct. 15, 2009

(30) Foreign Application Priority Data

Apr. 9, 2008 (CN) .......................... 2008 1 0066293

(51) Int. Cl.
*H02J 7/06* (2006.01)
*H02J 7/24* (2006.01)
*H02J 7/04* (2006.01)
*H02J 7/16* (2006.01)

(52) U.S. Cl. ......... 320/164; 320/139; 320/162; 320/163

(58) Field of Classification Search .................... 320/163
See application file for complete search history.

(56) References Cited

U.S. PATENT DOCUMENTS

| | | | |
|---|---|---|---|
| 5,350,996 A | | 9/1994 | Tauchi |
| 5,541,491 A | * | 7/1996 | Yamazaki et al. ............. 320/145 |
| 5,880,576 A | * | 3/1999 | Nagai ............................. 320/138 |
| 2004/0164708 A1 | * | 8/2004 | Veselic et al. ................. 320/132 |
| 2008/0197811 A1 | * | 8/2008 | Hartular et al. ............... 320/141 |
| 2009/0058369 A1 | * | 3/2009 | Wang et al. .................... 320/149 |
| 2009/0309547 A1 | * | 12/2009 | Nakatsuji ...................... 320/134 |
| 2010/0188051 A1 | * | 7/2010 | Yamazaki et al. ............. 320/148 |
| 2011/0025277 A1 | * | 2/2011 | Hussain et al. ................ 320/163 |

* cited by examiner

*Primary Examiner* — Patrick Assouad
*Assistant Examiner* — Nathaniel Pelton
(74) *Attorney, Agent, or Firm* — Altis Law Group, Inc.

(57) ABSTRACT

The present disclosure provides a battery charging control circuit. The charging control circuit includes: a constant-current charging unit and a trickle charging unit. The charging control circuit further includes a branch switch, a control unit, and a detection unit. The branch switch is connected between a power source and the rechargeable battery for enabling or disabling the constant-current charging unit. The control unit is between the constant-current charging unit and the branch switch for controlling the branch switch. The detection unit is used to detect a state of the rechargeable battery. If the detection unit detects the state of the rechargeable battery is correspond to a predetermined state, then the control unit controls the branch switch to disable the constant-current charging unit and enable the trickle charging unit.

12 Claims, 2 Drawing Sheets

BATTERY CHARGING CONTROL CIRCUIT

RELATED APPLICATIONS

This application is related to a co-pending U.S. patent application Ser. No. 12/411,354 filed concurrently herewith and entitled "BATTERY CHARGING CONTROL CIRCUIT", which is incorporated herein in its entirety by reference.

BACKGROUND

1. Technical Field

The present disclosure relates to battery circuits and, particularly, to a battery charging circuit.

2. General Background

Generally, battery chargers either use a constant current (CC) mode or a constant voltage (CV) mode to charge a battery. However, in either the CC mode or the CV mode, battery charging is terminated once the battery's voltage reaches a peak value (e.g., 4.2 V), which may result in the battery not being fully charged.

Therefore, it is necessary to provide an apparatus and method to overcome the above-identified deficiencies.

BRIEF DESCRIPTION OF THE DRAWINGS

The components in the drawings are not necessarily drawn to measuring scale, the emphasis instead being placed upon clearly illustrating the principles of the battery charging control circuit. Moreover, in the drawings, like reference numerals designate corresponding parts throughout the several views.

DETAILED DESCRIPTION OF THE EMBODIMENTS

Figure 1:
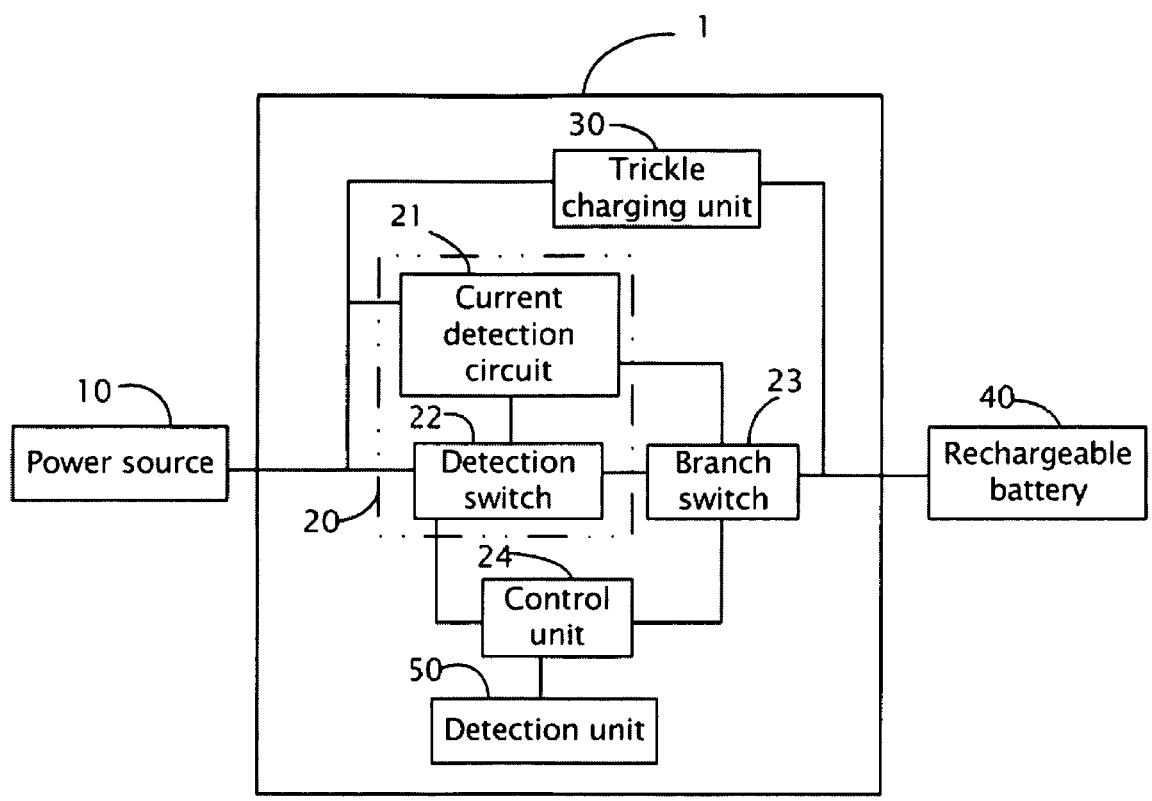
FIG. 1 is a block diagram of a battery charging control circuit in accordance with an exemplary embodiment.

Referring to FIG. 1, a battery charging control circuit 1 in accordance with an exemplary embodiment, includes a first branch and a second branch which are connected in parallel between a power source 10 and a rechargeable battery 40. The first branch includes a constant-current charging unit 20 and a branch switch 23, the second branch includes a trickle charging unit 30. The constant-current charging unit 20 includes a current detection circuit 21 and a detection switch 22. The battery charging control circuit 1 also includes a control unit 24, which is connected to the constant-current charging unit 20 and the branch switch 23, and includes a detection unit 50, which is connected to the control unit 24. The battery charging control circuit 1 firstly charges the rechargeable battery 40 under control of the constant-current charging unit 20 in a constant-current (cc) mode and then under control of the trickle charging unit 30 in a trickle mode. In the cc mode, the battery charging control circuit 1 charges the rechargeable battery 40 with a relatively large current, and in the trickle mode, the battery charging control circuit 1 charges the rechargeable battery 40 with a relatively small current.

The constant-current charging unit 20 is configured for charging the rechargeable battery 40 with a relatively large current in the cc mode. The current detection circuit 21 is configured for detecting current of the battery, and providing a detection voltage proportional to the current. The detection switch 22 is turned on or off based on the detection voltage.

The control unit 24 is configured for controlling the branch switch 23 to turn off or on depending on the on or off state of the detection switch 22. The branch switch 23 is configured for enabling or disabling the constant-current charging unit 20 in response to its on or off state. When the branch switch 23 is turned off, the current stops through the first branch, the constant-current charging unit 20 is disabled and the detection voltage drops to zero. As a result, the detection switch 22 is turned off corresponding to the "zero" detection voltage. When the detection switch 22 turns off, the control unit 24 controls the branch switch 23 to turn on again, the current flows through the first branch and the constant-current charging unit 20 is enabled. In such a way, the branch switch 23 is turned on and off periodically and the current flows and stops alternately through the first branch. The battery charging control circuit 1 charges the rechargeable battery 40 in a pulse charging phase of the cc mode.

The trickle charging unit 30 is configured for charging the rechargeable battery 40 with a relatively small current in the trickle mode. The detection unit 50 is configured for detecting states of the rechargeable battery 40 and producing detection signals according to the states. In the exemplary embodiment, the states include but are not limited to temperature of the rechargeable battery 40 and a sufficient charged state of the rechargeable battery 40. The control unit 24 is also configured for controlling the branch switch 23 to turn off upon receiving the detection signal from the detection unit 50. The control unit 24 is disabled to control the branch switch 23 according to states of the detection switch once the control unit 24 receives the detection signals from the detection unit 50, then, the first branch is opened and the second branch is employed to charge the rechargeable battery 40. Accordingly, the cc mode is terminated and the trickle mode is started.

Figure 2:
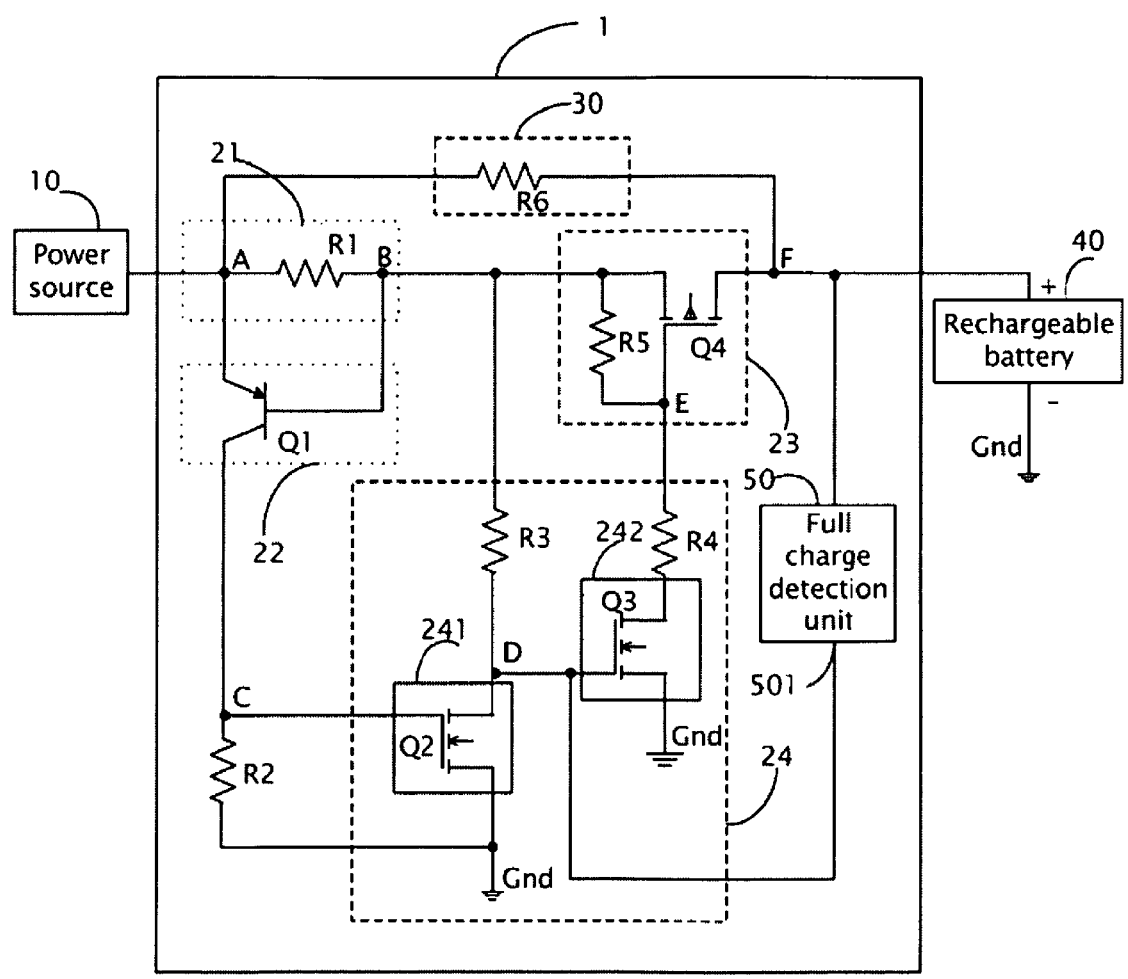
FIG. 2 is a circuit diagram of FIG. 1.

Referring to FIG. 2, in the exemplary embodiment, the current detection circuit 21 includes a resistor R1 with a terminal (shown as node A in FIG. 2) connected to the power source 10 and another terminal (shown as node B in FIG. 2) connected to the branch switch 23. The detection switch 22 can be a p-channel metal-oxide-semiconductor field-effect transistor (PMOSFET) or a positive-negative-positive (PNP) bipolar junction transistor (BJT). In the exemplary embodiment, a PNP BJT Q1 is taken as an example to illustrate the detection switch 22. An emitter of the PNP BJT Q1 is connected to node A and a base of the PNP BJT Q1 is connected to node B.

The branch switch 23 includes a low voltage activated switch Q4 and a resistor R5, the low voltage activated switch Q4 can be a PMOSFET or a PNP BJT. In the exemplary embodiment, a PMOSFET Q4 is taken as an example to illustrate the low voltage activated switch Q4. The resistor R5 is connected between a source of the PMOSFET Q4 and a gate (shown as node E in FIG. 2) of the PMOSFET Q4, and a drain (shown as node F in FIG. 2) of the PMOSFET Q4 is connected to an anode of the rechargeable battery 40.

The control unit 24 includes a first switch 241 and a second switch 242. The first switch 241 and the second switch 242 can be NMOSFETs or NPN BJTs. In the exemplary embodiment, NMOSFETs Q2 and Q3 are taken as an example to illustrate the first switch 241 and the second switch 242 correspondingly. A gate (shown as node C in FIG. 2) of the NMOSFET Q2 is connected to a collector of the NPN BJT Q1, the gate is also connected to ground through a resistor R2, a drain of the NMOSFET Q2 is grounded, a source (shown as node D in FIG. 2) of the NMOSFET Q2 is connected to a gate of the NMOSFET Q3. The node D is also connected to node B through a resistor R3. A source of the NMOSFET Q3 is grounded and a drain of the NMOSFET Q3 is connected to the gate (node E) of the NMOSEFET Q4 through a resistor R4.

The trickle charging unit 30 includes a resistor R6 which is connected between the power source 10 and the anode of the rechargeable battery 40. The resistance value of the resistor R6 is much larger than that of the resistor R1.

Because the resistor R6 has a much higher resistance value than the resistor R1, when the battery charging control circuit 1 receives the power source 10 and starts charging the rechargeable battery 40, the resistor R6 is bypassed by the resistor R1, namely the battery charging control circuit 1 charges the rechargeable battery 40 in the cc mode initially. The current of the resistor R1 is increased gradually and so does the detection voltage in proportion to the current increases too. If the detection voltage is larger than a threshold voltage of the NPN BJT Q1, the NPN BJT Q1 is turned on, then the gate of the NMOSFET Q2 obtains a high voltage through the NPN BJT Q1 and the NMOSFET Q2 is accordingly turned on. The gate of the NMOSFET Q3 is grounded through the NMOSFET Q2 and the NMOSFET Q3 is accordingly turned off. A current path defined by the resistors R1, R4, R5 and the NMOSFET Q3 is cut off and no voltage is applied to the resistor R5. There is no voltage drop across the source and gate of the PMOSFET Q4. Thus, the PMOSFET Q4 is turned off.

When the PMOSFET Q4 is turned off, the current of the resistor R1 drops and the detection voltage drops too. When the detection voltage is lower than the threshold voltage of the NPN BJT Q1, the NPN BJT Q1 is turned off, then the gate of the NMOSFET Q2 is grounded through the resistor R2 and the NMOSFET Q2 is turned off accordingly. The gate of the NMOSFET Q3 is connected to the node B through the resistor R3 and the NMOSFET Q3 is turned on accordingly. The current path defined by the resistors R1, R4, R5 and the NMOSFET Q3 is re-established. A voltage drop across the resistor R5 turns on the PMOSFET Q4, and current flows through the first branch again to charge the rechargeable battery 40.

As described above, in the cc mode, the PMOSFET Q4 cycles on and off, and the battery charging control circuit 1 charges or pauses charging the rechargeable battery 40 periodically. In other words, the battery charging control circuit 1 charges the recharge battery 40 in the pulse charging phase of the cc mode.

In the exemplary embodiment, the detection unit 50 is a full charge detection unit 50, which is configured for outputting a full-charge signal when the rechargeable battery 40 is nearly fully charged. An output port 501 of the full charge detection unit 50 is connected to the gate of the NMOSFET Q3. In the exemplary embodiment, the full-charge signal is a low voltage signal.

If the full charge detection unit 50 detects the rechargeable battery 40 is nearly fully charged, the full charge detection unit 50 transmits a low voltage signal to the gate of the NMOSFET Q3 and accordingly turns off the NMOSFET Q3. A current path defined by the resistors R1, R4, R5 and the NMOSFET Q3 is cut off and voltage to the resistor R5 is removed. There is no voltage drop across the source and gate of the PMOSFET Q4. Thus, the NMOSFET Q4 is turned off and the first branch is cut off, the battery charging control circuit 1 charges the rechargeable battery 40 through the trickle charge unit 30 of the second branch, namely, the battery charging control circuit 1 charges the rechargeable battery 40 in the trickle mode. Because the resistance value of the resistor R6 of the trickle charging unit 30 is relatively large, the current flowing through the resistor R6 is small, and the battery charging control circuit 1 charges the rechargeable battery 40 with a small current in the trickle mode.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the present disclosure.

What is claimed is:

1. A battery charging control circuit, comprising:
   a trickle charging unit configured for charging a rechargeable battery with a first current in a trickle mode;
   a constant-current charging unit configured for charging a rechargeable battery with a second current greater than the first current in a constant-current mode, comprising:
   a current detection circuit configured for detecting current of the battery, and providing a detection voltage proportional to the current; and
   a detection switch is turned on or off under the control of the detection voltage, wherein, the detection switch is a low voltage activated switch comprising a control terminal, a first path terminal, and a second path terminal, the first path terminal of the detection switch is connected to an input port of the current detection circuit, the second path terminal of the detection switch is grounded, and the control terminal of the detection switch is connected to an output of the current detection circuit;
   a branch switch connected between the constant-current charging unit and an anode of the rechargeable battery, configured for enabling or disabling the constant-current charging unit, wherein the branch switch comprises a first switch and a first resistor, a control terminal of the first switch is connected to the control unit, a first path terminal of the first switch is connected to the control terminal of the detection switch, a second path terminal of the first switch is connected to the anode of the rechargeable battery; the first resistor is connected between the control terminal and the first path terminal of the first switch;
   a detection unit configured for detecting states of the rechargeable battery and outputting detection signals when detecting a predetermined state of the rechargeable battery, wherein, the detection switch and the current detection circuit are connected in parallel between the power source and the branch switch, the detection switch is turned on or off according to the detection voltage of the current detection circuit; and
   a control unit connected with the constant-current charging unit and the branch switch, configured for controlling the branch switch to turn off to disable the constant-current charging unit in response to the detection signal from the detection unit, wherein, if the branch switch is turned off, the constant-current charging unit is disabled and the trickle charging unit starts charging the rechargeable battery.

2. The battery charging control circuit of claim 1, wherein the trickle charging unit comprises a resistor which is connected between a power source and an anode of the rechargeable battery.

3. The battery charging control circuit of claim 1, wherein the control unit controls the branch switch to turn off when the detection switch is turned on, and controls the branch switch to turn on when the detection switch is turned off, the detection voltage of the current detection circuit is changed in response to the on or off state of the control switch.

4. The battery charging circuit of claim 1, wherein the detection switch is a positive-negative-positive pnp bipolar junction transistor (BJT), the control terminal, the first path terminal, and the second path terminal of the detection switch correspond to a base, an emitter, and a collector, respectively, of the pnp BJT.

5. The battery charging circuit of claim 1, wherein the detection switch is a p-channel metal-oxide-semiconductor field-effect transistor (PMOSFET), the control terminal, the first path terminal, and the second path terminal of the detection switch correspond to a gate, a source, and a drain, respectively, of the PMOSFET.

6. The battery charging control circuit of claim 1, wherein the first switch is a pnp BJT, the control terminal, the first path terminal, and the second path terminal of the first switch correspond to a base, an emitter, and a collector, respectively, of the pnp mBJT.

7. The battery charging circuit of claim 1, wherein the first switch is a PMOSFET, the control terminal, the first path terminal, and the second path terminal of the detection switch correspond to a gate, a source, and a drain, respectively, of the PMOSFET.

8. The battery charging circuit of claim 1, wherein the control unit comprises a second switch and a third switch, the second switch and the third switch each comprise a control terminal, a first path terminal, and a second path terminal, a control terminal of the second switch is connected to the second path terminal of the detection switch, a first path terminal of the second switch is connected to the control terminal of the detection switch through a second resistor, a second path terminal of the second switch is grounded; a control terminal of the third switch is connected to the first path terminal of the second switch, a first path terminal of the third switch is grounded, and a second path terminal of the third switch is connected to the control terminal of the first switch through a third resistor.

9. The battery charging control circuit of claim 8, wherein the second switch and the third switch are negative-positive-negative npn bipolar junction transistors (BJTs), the control terminals, the first path terminals, and the second path terminals of the second switch and the third switch correspond to bases, emitters, and collectors, respectively, of the npn BJTs.

10. The battery charging circuit of claim 8, wherein the second switch and the third switch are n-channel metal-oxide-semiconductor field-effect transistors (NMOSFETs), the control terminals, the first path terminals, and the second path terminals of the second switch and the third switch correspond to gates, sources, and drains, respectively, of the NMOSFETs.

11. The battery charging control circuit of claim 1, wherein the current detection circuit is a resistor.

12. The battery charging control circuit of claim 1, wherein the detection unit is a full-charging detection unit configured for outputting full-charge signal when the rechargeable battery is nearly fully charged.

* * * * *